US012483807B2

(12) United States Patent
Sakane

(10) Patent No.: US 12,483,807 B2
(45) Date of Patent: Nov. 25, 2025

(54) IMAGING DEVICE, METHOD OF CONTROLLING IMAGING DEVICE, AND SHAPE MEASURING DEVICE

(71) Applicant: SONY SEMICONDUCTOR SOLUTIONS CORPORATION, Kanagawa (JP)

(72) Inventor: Seijiro Sakane, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 208 days.

(21) Appl. No.: 17/998,667

(22) PCT Filed: May 14, 2021

(86) PCT No.: PCT/JP2021/018339
§ 371 (c)(1),
(2) Date: Nov. 13, 2022

(87) PCT Pub. No.: WO2021/241265
PCT Pub. Date: Dec. 2, 2021

(65) Prior Publication Data
US 2023/0199340 A1 Jun. 22, 2023

(30) Foreign Application Priority Data
May 27, 2020 (JP) .................. 2020-092068

(51) Int. Cl.
H04N 25/47 (2023.01)
G01B 11/25 (2006.01)
(Continued)

(52) U.S. Cl.
CPC ....... *H04N 25/616* (2023.01); *G01B 11/2522* (2013.01); *G06T 7/50* (2017.01);
(Continued)

(58) Field of Classification Search
None
See application file for complete search history.

(56) References Cited

U.S. PATENT DOCUMENTS 11,869,273 B2 * 1/2024 Endo ............... H04N 25/50
2014/0270459 A1 * 9/2014 Moll ............... G06T 7/269
427/256

(Continued)

FOREIGN PATENT DOCUMENTS

CN 109458928 A 3/2019
EP 2908091 A1 * 8/2015 ............. G01B 11/24
(Continued)

OTHER PUBLICATIONS

STIC Provided Translation of WO2019/135411 A1 (Year: 2019).*
(Continued)

Primary Examiner — Tyler W. Sullivan
(74) Attorney, Agent, or Firm — CHIP LAW GROUP

(57) ABSTRACT

Provided is an imaging device that includes an imaging section in which pixels that photoelectrically convert entering light reflected from a measurement object are arranged, the imaging section detecting that amounts of change in luminance of the pixels have exceeded a predetermined threshold as events, and an event suppression section that removes an event having position information outside a range of an upper limit setting value and a lower limit setting value of an expected position from among the events detected by the imaging section as an unnecessary event.

17 Claims, 13 Drawing Sheets

(51) Int. Cl.
*G06T 7/50* (2017.01)
*G06V 10/145* (2022.01)
*H04N 25/616* (2023.01)
*H04N 25/78* (2023.01)

(52) U.S. Cl.
CPC .......... *G06V 10/145* (2022.01); *H04N 25/47* (2023.01); *G06T 2200/04* (2013.01); *H04N 25/78* (2023.01)

(56) References Cited

U.S. PATENT DOCUMENTS

2017/0228874 A1* 8/2017 Roberts ................ H02J 7/0068
2020/0284883 A1* 9/2020 Ferreira ................ G01S 7/4815

FOREIGN PATENT DOCUMENTS

| | | |
|---|---|---|
| JP | 2001-188008 A | 7/2001 |
| JP | 2012-220473 A | 11/2012 |
| JP | 2013-234854 A | 11/2013 |
| JP | 2019-134271 A | 8/2019 |
| WO | 2014/057580 A1 | 4/2014 |
| WO | WO-2019135411 A1 * | 7/2019 ............ H04N 5/345 |
| WO | 2021/084832 A1 | 5/2021 |

OTHER PUBLICATIONS

International Search Report and Written Opinion of PCT Application No. PCT/JP2021/018339, issued on Jul. 6, 2021, 10 pages of ISRWO.

* cited by examiner

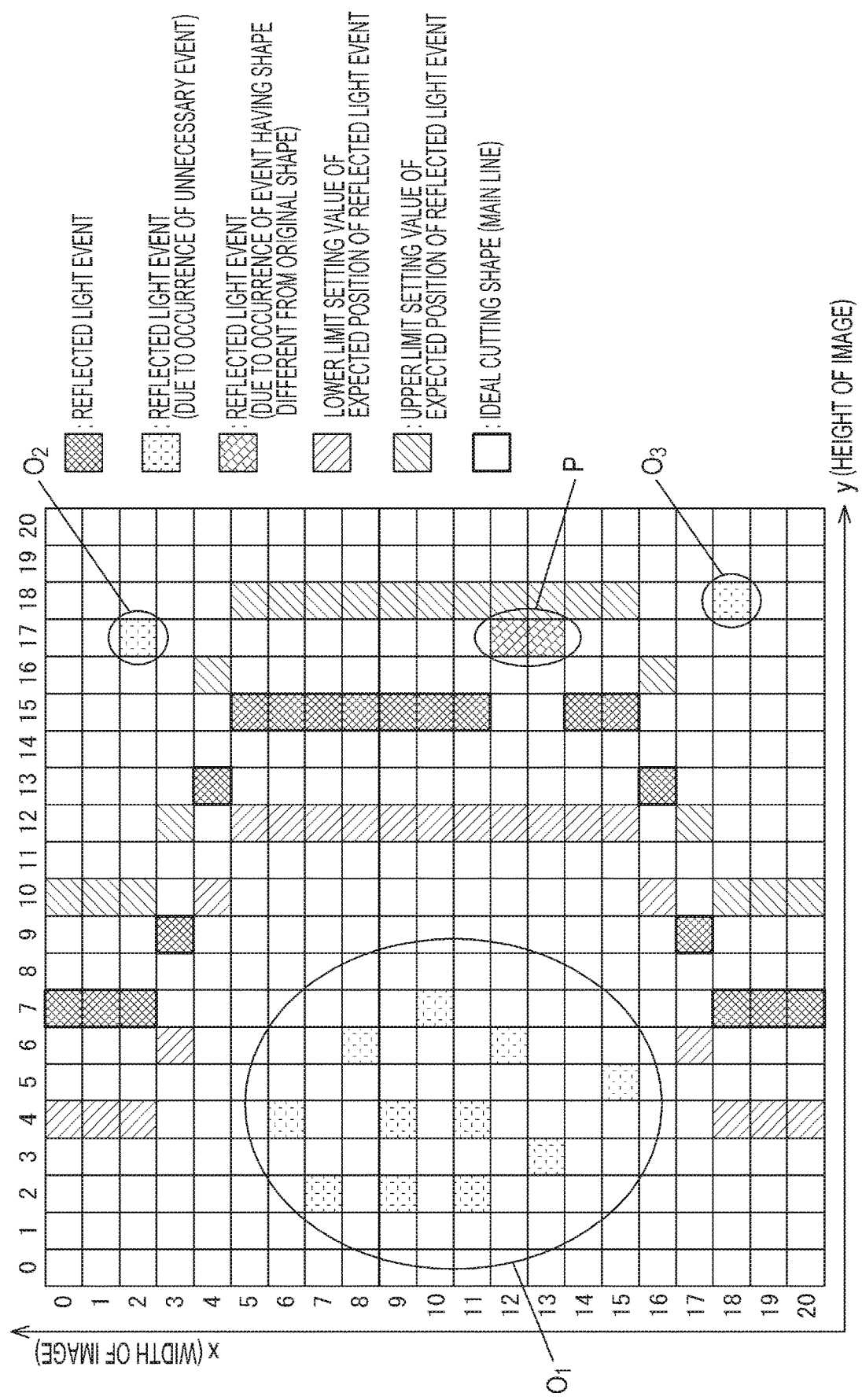

IMAGING DEVICE, METHOD OF CONTROLLING IMAGING DEVICE, AND SHAPE MEASURING DEVICE

CROSS REFERENCE TO RELATED APPLICATIONS

This application is a U.S. National Phase of International Patent Application No. PCT/JP2021/018339 filed on May 14, 2021, which claims priority benefit of Japanese Patent Application No. JP 2020-092068 filed in the Japan Patent Office on May 27, 2020. Each of the above-referenced applications is hereby incorporated herein by reference in its entirety.

TECHNICAL FIELD

The present disclosure relates to an imaging device, a method of controlling the imaging device, and a shape measuring device.

BACKGROUND ART

There is a non-scanning (asynchronous) imaging device called a dynamic vision sensor (DVS) (for example, see Patent Document 1) as opposed to a scanning (synchronous) imaging device that performs imaging in synchronization with a synchronization signal such as a vertical synchronization signal. The non-scanning imaging device can detect that an amount of change in luminance of a pixel that photoelectrically converts incident light has exceeded a predetermined threshold as an event.

As one of applications of the non-scanning imaging device, for example, a shape measuring device using a light cutting method can be named. The light cutting method is a technique used for shape abnormality detection of measurement objects, particularly in an inspection process in a factory or the like. In the shape measurement using the light cutting method, the width, the height, and the like of a measurement object (physical object) are measured from a shape of an imaging cross section when the measurement object is irradiated with line-shaped light from a light projecting section, and reflected light, from the measurement object, based on the irradiation light is received by the non-scanning imaging device.

CITATION LIST

Patent Document

Patent Document 1: Japanese Patent Application Laid-Open No. 2019-134271

SUMMARY OF THE INVENTION

Problems to be Solved by the Invention

As described above, for example, in a shape measuring device using the light cutting method, which is one of applications of the non-scanning imaging device, shape measurement is performed by receiving reflected light, from a measurement object, based on irradiation light from a light projecting section. However, in this case, an imaged shape is different from the original shape due to reflecting condition of disturbance light and the irradiation light from the light projecting section, and the like, and as a result, there is a case where correct shape measurement cannot be performed.

It is an object of the present disclosure to provide an imaging device, a method of controlling the same, and a shape measuring device using the imaging device capable of suppressing an influence of reflecting condition of disturbance light and irradiation light from a light projecting section, and the like.

Solutions to Problems

An imaging device of the present disclosure for achieving the above-described object includes:
an imaging section in which pixels that photoelectrically convert entering light reflected from a measurement object are arranged, the imaging section detecting that amounts of change in luminance of the pixels have exceeded a predetermined threshold as events; and
an event suppression section that removes an event having position information outside a range of an upper limit setting value and a lower limit setting value of an expected position from among the events detected by the imaging section as an unnecessary event.

A method of controlling an imaging device of the present disclosure for achieving the above-described object includes,
in controlling the imaging device that includes
an imaging section in which pixels that photoelectrically convert entering light reflected from a measurement object are arranged, the imaging section detecting that amounts of change in luminance of the pixels have exceeded a predetermined threshold as events,
removing an event having position information outside a range of an upper limit setting value and a lower limit setting value of an expected position from among the events detected by the imaging section as an unnecessary event.

A shape measuring device of the present disclosure for achieving the above-described object, includes:
a light projecting section that irradiates a measurement object with light; and
a light receiving section that receives reflected light, from the measurement object, based on irradiation light from the light projecting section,
in which the light receiving section includes:
an imaging section in which pixels that photoelectrically convert entering light reflected from the measurement object are arranged, the imaging section detecting that amounts of change in luminance of the pixels have exceeded a predetermined threshold as events; and
an event suppression section that removes an event having position information outside a range of an upper limit setting value and a lower limit setting value of an expected position from among the events detected by the imaging section as an unnecessary event.

BRIEF DESCRIPTION OF DRAWINGS

FIG. 8 is a conceptual diagram of processing in an unnecessary event suppression section (1) according to Example 2.

MODE FOR CARRYING OUT THE INVENTION

Figure 1:
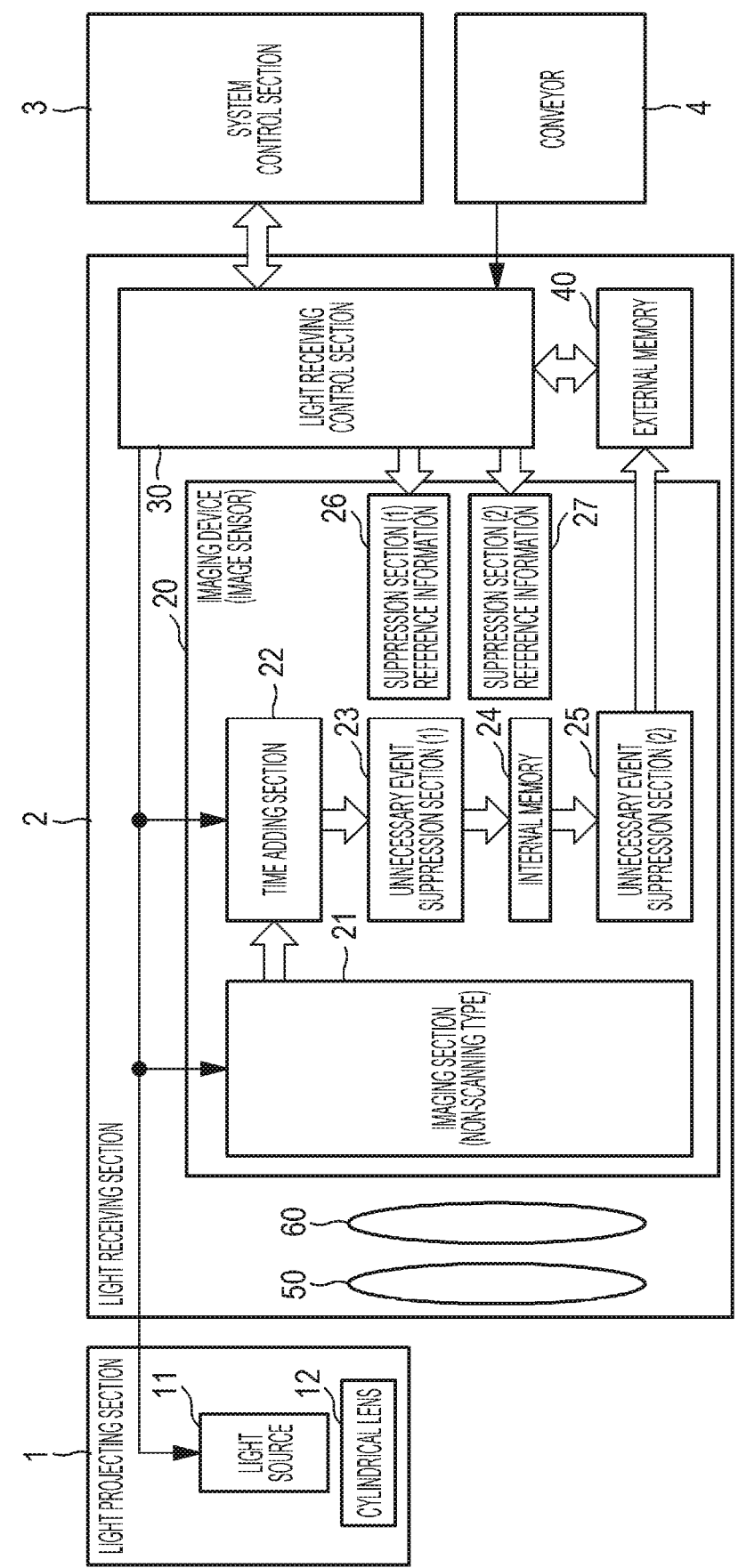
FIG. 1 is a block diagram schematically illustrating a system configuration of a shape measuring device including an imaging device according to an embodiment of the present disclosure.

Hereinafter, a mode for carrying out the technology of the present disclosure (hereinafter, referred to as "embodiment") will be described in detail with reference to the drawings. The technology of the present disclosure is not limited to the embodiment, and various numerical values, materials, and the like in the embodiment are examples. In the following description, the same reference signs are used for the same components or components having the same function, and duplicate description will be omitted. Note that description will be made in the following order.
1. General description of imaging device, method of controlling the same, and shape measuring device according to present disclosure
2. Imaging device and shape measuring device according to embodiment of present disclosure
   2-1. Configuration example of light projecting section
   2-2. Configuration example of light receiving section
   2-3. Operation and advantageous effects of embodiment
   2-4. Configuration example of imaging section
   2-4-1. Configuration example of pixel array section
   2-4-2. Circuit configuration example of pixel
   2-4-3. Configuration example of address event detection section
3. Method of controlling imaging device according to embodiment of present disclosure
   3-1. Example 1 (example of control for removing unnecessary events and detecting valid events)
   3-2. Example 2 (processing example of sub-process of unnecessary event suppression section (1))
   3-3. Example 3 (processing example of sub-process of suppression section (1) reference information setting section)
   3-4. Example 4 (first processing example of sub-process of unnecessary event suppression section (2))
   3-5. Example 5 (first processing example of sub-process of suppression section (2) reference information setting section)
   3-6. Example 6 (second processing example of sub-process of unnecessary event suppression section (2))
   3-7. Example 7 (second processing example of sub-process of suppression section (2) reference information setting section)
4. Modification
5. Configuration that can be Taken by Present Disclosure <General Description of Imaging Device, Method of Controlling the Same, and Shape Measuring Device According to Present Disclosure>

An imaging device, a method of controlling the same, and a shape measuring device according to the present disclosure can include a first reference information setting section that sets in advance upper limit setting values and lower limit setting values of expected positions as reference information of an event suppression section. Furthermore, the first reference information setting section can be configured to be capable of setting the upper limit setting values and the lower limit setting values of the expected positions by manual setting based on an N increase result of increasing a number of times N of measurement execution by a user, or automatic setting based on an average value calculation result of position information of valid events remaining after removal processing by the event suppression section.

In the imaging device, the method of controlling the same, and the shape measuring device according to the present disclosure including the preferred configuration described above, the event suppression section can be configured to detect, with an ideal cutting shape as a main line, a position of the main line on an assumption that an image obtained by imaging a measurement object has a line shape, and remove an event having a shape different from an original shape of the measurement object as an unnecessary event according to a relationship between position information of the main line detected and position information of events that have occurred.

Furthermore, in the imaging device, the method of controlling the same, and the shape measuring device according to the present disclosure including the preferred configuration described above, the event suppression section can be configured to detect the position of the main line by moving average processing. Furthermore, the event suppression section can be configured to interpolate and output data of the event removed by using data obtained through the moving average processing.

Furthermore, in the imaging device, the method of controlling the same, and the shape measuring device according to the present disclosure including the preferred configuration described above, the event suppression section can be configured to remove an event in which a distance between the position of the main line detected and the position of the event that has occurred does not fall within a predetermined inter-main line distance value as an unnecessary event. Furthermore, a second reference information setting section that sets in advance the predetermined inter-main line distance value as reference information of the event suppression section can be included. In addition, the second reference information setting section can be configured to be capable of setting the predetermined inter-main line distance value by manual setting based on an N increase result of increasing a number of times N of measurement execution by a user, or automatic setting based on an average value calculation result of position information of valid events remaining after removal processing by the event suppression section.

Furthermore, in the imaging device, the method of controlling the same, and the shape measuring device according to the present disclosure including the preferred configuration described above, data of the events detected by the imaging section can include, in addition to the position information, gradation information. Furthermore, the event suppression section can be configured to remove an event having the gradation information less than a predetermined gradation threshold as an unnecessary event.

Furthermore, in the imaging device, the method of controlling the same, and the shape measuring device according to the present disclosure including the preferred configuration described above, the imaging section can include a non-scanning imaging device.

In the shape measuring device according to the present disclosure, the measurement object can be mounted on a conveyor and be moved, and the light projecting section can be configured to irradiate the measurement object with linear light in a direction perpendicular to a moving direction of the measurement object.

<Imaging Device and Shape Measuring Device According to Embodiment of Present Disclosure>

A shape measuring device according to an embodiment of the present disclosure includes a light projecting section that irradiates a measurement object with light and a light receiving section that receives reflected light, from the measurement object, based on irradiation light from the light projecting section, and for example, is a device that measures a shape of the measurement object by a light cutting method in a shape measuring system used in an inspection process in a factory or the like. As is well known, in the light cutting method, a cross-sectional shape of the irradiation light from the light projecting section is the shape of the measurement object.

Furthermore, an imaging device according to the embodiment of the present disclosure is an imaging device used in the light receiving section in the shape measuring device according to the embodiment of the present disclosure, and includes an imaging section in which pixels that photoelectrically convert entering light reflected from a measurement object are arranged. The imaging section detects that amounts of change in luminance of the pixels have exceeded a predetermined threshold as events. The imaging section includes a non-scanning imaging device called a DVS.

Figure 2:
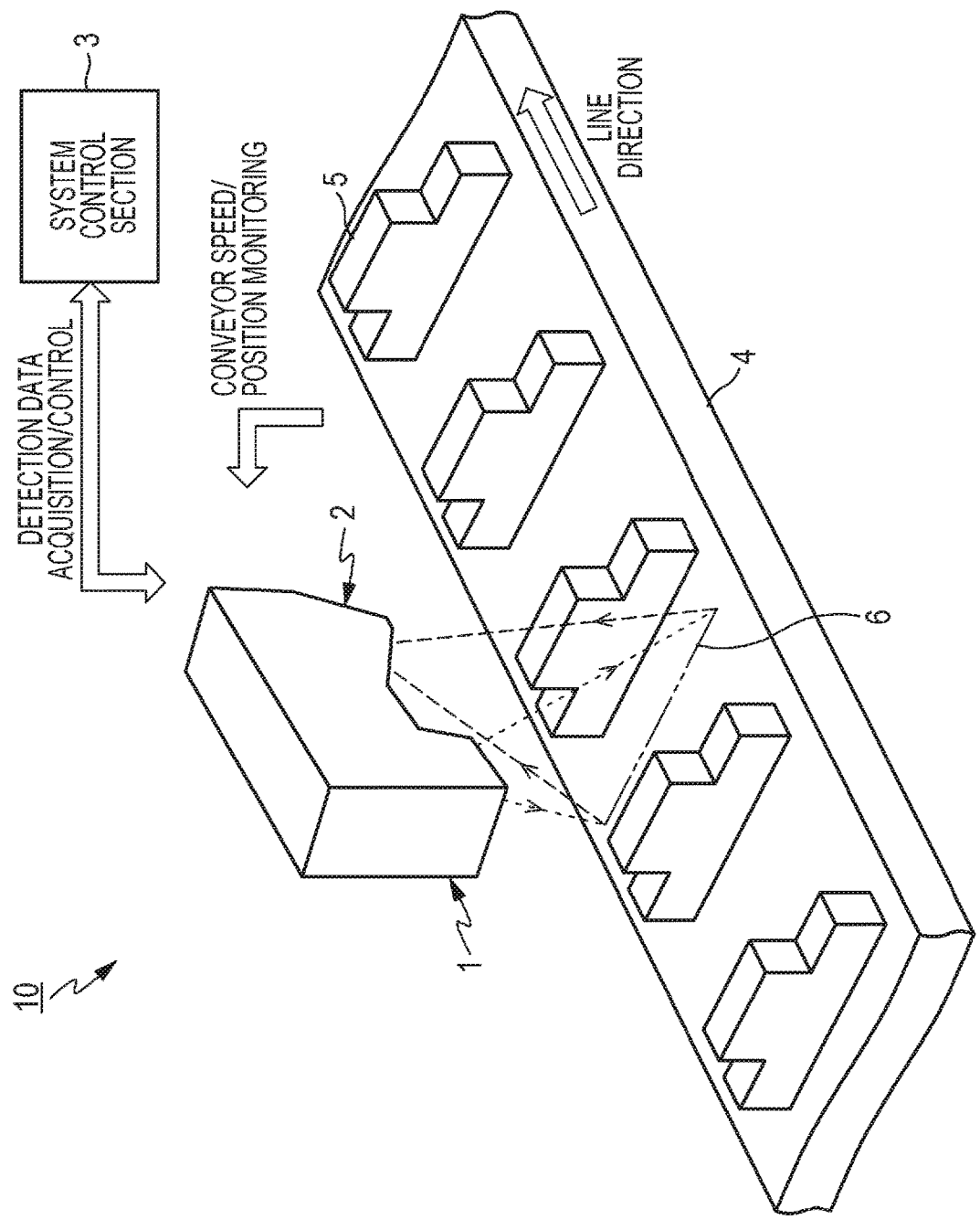
FIG. 2 is a schematic diagram schematically illustrating a system configuration of a shape measuring system using the shape measuring device according to the embodiment of the present disclosure.

FIG. 1 illustrates a block diagram of a system configuration of the shape measuring device including the imaging device according to the embodiment of the present disclosure, and FIG. 2 illustrates a schematic diagram of a system configuration of the shape measuring system using the shape measuring device according to the embodiment of the present disclosure.

A shape measuring device 10 according to the embodiment of the present disclosure includes a light projecting section 1, a light receiving section 2, and a system control section 3, and measures a shape such as a width and a height of a measurement object 5 that is mounted on a conveyor 4 and is moved. Specifically, the light projecting section 1 irradiates the measurement object 5 with linear light 6 in a direction perpendicular to a moving direction (line direction) of the measurement object 5. Under the control of the system control section 3, the light receiving section 2 receives reflected light, from the measurement object 5, based on the irradiation light from the light projecting section 1, and performs shape measurement of the measurement object 5 with reference to a result of speed/position monitoring of the conveyor 4.

[Configuration Example of Light Projecting Section]

The light projecting section 1 includes a light emitting diode (LED) or the like as a light source 11, and includes a cylindrical lens 12. The light source 11 irradiates the measurement object 5 with light under the control of a light receiving control section 30 of the light receiving section 2. The cylindrical lens 12 emits light output from the light source 11 as linear light in one direction. More specifically, the cylindrical lens 12 irradiates the measurement object 5 with the linear light 6 in the direction perpendicular to the moving direction of the measurement object 5.

[Configuration Example of Light Receiving Section]

The light receiving section 2 includes the light receiving control section 30 that performs control of an imaging device 20 as an image sensor, control of the light source 11, and control of the entire light receiving section 2, and an external memory 40. Reflected light, from the measurement object 5, based on the irradiation light from the light projecting section 1 enters the imaging device 20 through an infrared cut filter 50 and a lens 60.

The imaging device 20 is an imaging device according to the embodiment of the present disclosure. The imaging device 20 includes an imaging section 21, a time information adding section 22, an unnecessary event suppression section (1) 23, an internal memory 24, an unnecessary event suppression section (2) 25, a suppression section (1) reference information setting section 26, and a suppression section (2) reference information setting section 27. The unnecessary event suppression section (1) 23 and the unnecessary event suppression section (2) 25 correspond to an event suppression section described in the claims.

The imaging section 21 includes a non-scanning (asynchronous) imaging device, in which pixels that photoelectrically convert entering light reflected from the measurement object 5 are two-dimensionally arranged in a matrix. The imaging section 21 detects that amounts of change in luminance of the pixels have exceeded a predetermined threshold as events, and outputs event data including position information (coordinate data) indicating coordinate positions of the events, under the control of the light receiving control section 30. There is a case where the event data includes, in addition to the position information, time information indicating relative time points at which events have occurred, or there is a case where the event data includes gradation information indicating signal levels. Details of the imaging section 21 including the non-scanning imaging device will be described later.

In a case where the event data output from the imaging section 21 includes only the position information (coordinate data) but does not include the time information, the time information adding section 22 adds the time information to the event data output from the imaging section 21 under the control of the light receiving control section 30. The time information adding section 22 can also be included in the imaging section 21. In this case, the event data output from the imaging section 21 includes the position information and the time information.

The unnecessary event suppression section (1) 23 utilizes the position information (coordinate data) and the time information that are the event data, compares the position information of events occurring within a certain unit time with upper limit setting values and lower limit setting values of expected positions set in advance as reference information, specifies unnecessary events, and removes the data thereof.

Here, the "certain unit time" is, for example, a period (length of time) during which the measurement object 5 moving at a predetermined speed under the driving of the conveyor 4 irradiated with the linear light 6 over the entire measurement object 5 in FIG. 2. Furthermore, the unnecessary event suppression section (1) 23 performs processing in which events occurring having the position information outside the range of the upper limit setting values and the lower limit setting values of the expected positions are specified as unnecessary events, and removed as unnecessary events.

The internal memory 24 at the subsequent stage of the unnecessary event suppression section (1) 23 stores the position information and the time information of events that have not been removed as unnecessary events by the unnecessary event suppression section (1) 23.

The unnecessary event suppression section (2) 25 detects, with an ideal cutting shape as a main line, the position of the main line on the assumption that an image obtained by imaging the measurement object 5 has a line shape. The detection of the position of the main line can be performed by, for example, moving average processing in which an average value for each certain given zone is obtained while shifting the zone in time-series data, or the like.

Moreover, the unnecessary event suppression section (2) 25 specifies, according to the relationship between the position information of the main line detected and the position information of the events that have occurred, events having a shape different from the original shape of the measurement object 5 from among the events stored in the internal memory 24 without being removed by the unnecessary event suppression section (1) 23, and removes the data thereof (and interpolates, as necessary).

The suppression section (1) reference information setting section 26 is a first reference information setting section, and sets in advance the upper limit setting values and the lower limit setting values of the expected positions used for comparison with the position information of events occurring within a certain unit time in the unnecessary event suppression section (1) 23 as the reference information, under the control of the light receiving control section 30.

The suppression section (2) reference information setting section 27 is a second reference information setting section, and sets in advance the reference information used for detecting the position of the main line performed by the moving average processing or the like in the unnecessary event suppression section (2) 25, under the control of the light receiving control section 30. As the reference information used for detecting the position of the main line, the number of moving average data, an inter-main line distance value, and a gradation level threshold, which will be described later, can be named.

Data of events remaining without being removed as unnecessary events (noises) by processing in the unnecessary event suppression section (1) 23 and processing in the unnecessary event suppression section (2) 25 is output to the outside of the imaging device 20 as valid events, and stored in the external memory 40.

The detection data of the valid events stored in the external memory 40 is supplied to the system control section 3 provided outside the light receiving section 2 under the control of the light receiving control section 30. The system control section 3 includes, for example, a personal computer or the like, acquires the detection data of the valid events output from the light receiving section 2, and performs control of shape measurement and the like of the measurement object 5 on the basis of the detection data.

[Operation and Advantageous Effects of Embodiment]

As described above, in the imaging device 20 according to the embodiment of the present disclosure, by the processing in the unnecessary event suppression section (1) 23, data of the events having the position information outside the range of the upper limit setting values and the lower limit setting values of the expected positions are removed from among the events detected by the imaging section 21 as unnecessary events. Moreover, by the processing in the unnecessary event suppression section (2) 25, the position of the main line (ideal cutting shape) is detected on the assumption that an image obtained by imaging has a line shape, and data of the events having a shape different from the original shape is removed as unnecessary events (and interpolated, as necessary) by comparison with the position information of the main line detected.

In this manner, data of the unnecessary events (noises) is removed by the processing in the unnecessary event suppression section (1) 23 and the processing in the unnecessary event suppression section (2) 25. Accordingly, the influence of reflecting condition of disturbance light and the irradiation light from the light projecting section 1, and the like can be suppressed. Furthermore, the data of the remaining events is output as valid events. Accordingly, the amount of output data can be greatly reduced. In addition, the shape measurement is performed on the basis of the detection data of the valid events remaining without being removed as unnecessary events (noises). Accordingly, correct shape measurement can be implemented in the shape measurement of the measurement object 5.

[Configuration Example of Imaging Section]

Figure 3:
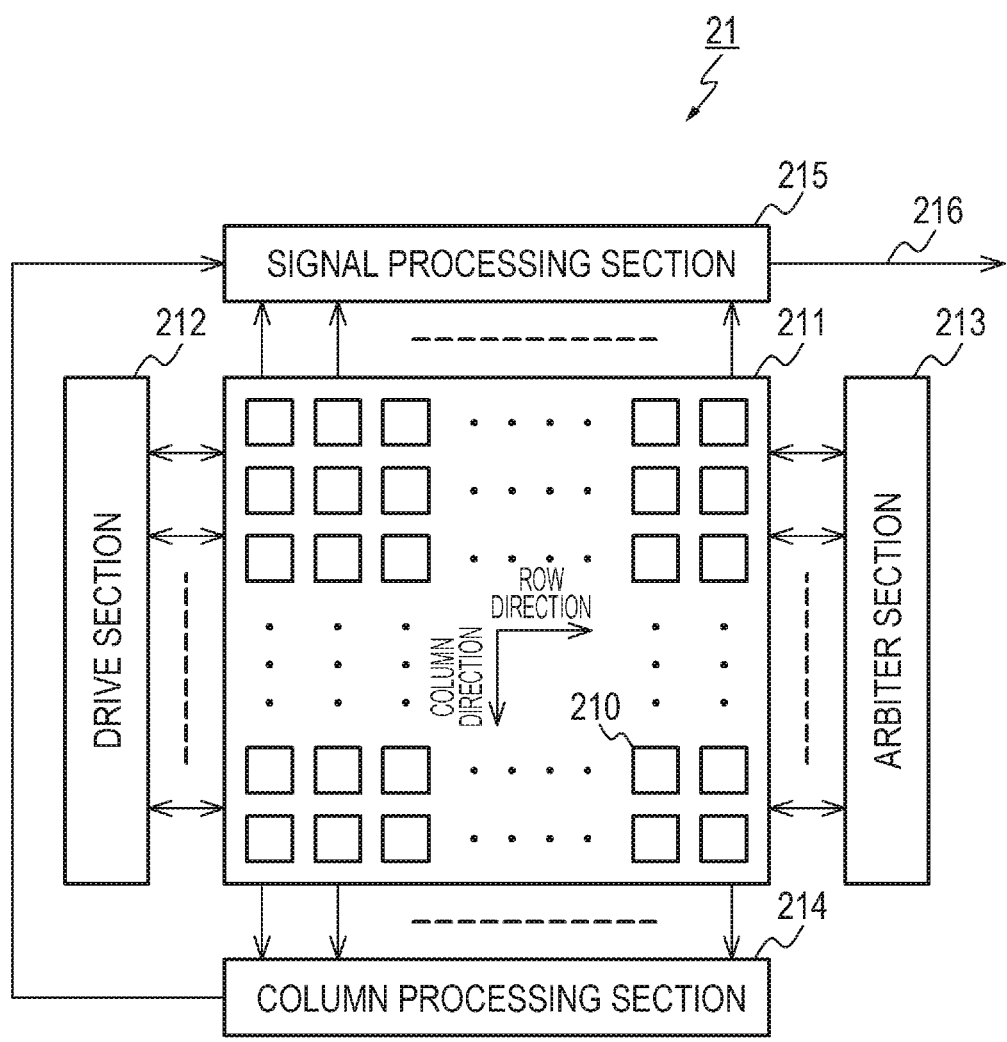
FIG. 3 is a block diagram illustrating an example of a configuration of an imaging section of the imaging device according to the embodiment of the present disclosure.

Next, a configuration example of the imaging section 21 of the imaging device 20 according to the embodiment of the present disclosure will be described in detail below. FIG. 3 is a block diagram illustrating an example of a configuration of the imaging section 21.

As illustrated in FIG. 3, the imaging section 21 according to the present example includes a non-scanning (asynchronous) imaging device called a DVS, and includes a pixel array section 211, a drive section 212, an arbiter section 213, a column processing section 214, and a signal processing section 215.

In the imaging section 21 having the configuration described above, a plurality of pixels 210 is two-dimensionally arrayed in a matrix (array shape) in the pixel array section 211.

The plurality of pixels 210 each generate an analog signal having a voltage corresponding to a photocurrent as a pixel signal. Furthermore, the plurality of pixels 210 each detect the presence or absence of an address event according to whether or not the amount of change in photocurrent has exceeded the predetermined threshold. Then, when an address event has occurred, the pixel 210 outputs a request to the arbiter section 213.

The drive section 212 drives the plurality of pixels 210 to pixel signals generated in the respective pixels 210 to be output to the column processing section 214.

The arbiter section 213 arbitrates requests from the plurality of pixels 210, and transmits responses based on the arbitration result to the pixels 210. The pixel 210 that has received the response from the arbiter section 213 supplies event data (address event detection signal) indicating the detection result to the drive section 212 and the signal processing section 215. Reading out of the event data from the pixels 210 can also be performed by reading out a plurality of rows.

The column processing section 214 includes, for example, an analog-to-digital converter or the like, and performs, in each pixel column of the pixel array section 211, processing of converting analog pixel signals output from the pixels 210 in the column into digital signals, or the like. Then, the column processing section 214 supplies the digital signals after the analog-to-digital conversion to the signal processing section 215

The signal processing section 215 executes, on the digital signals supplied from the column processing section 214, predetermined signal processing such as correlated double sampling (CDS) processing and image recognition processing. Then, the signal processing section 215 outputs data indicating the processing result and event data supplied from the arbiter section 213 through a signal line 216.

(Configuration Example of Pixel Array Section)

Figure 4:
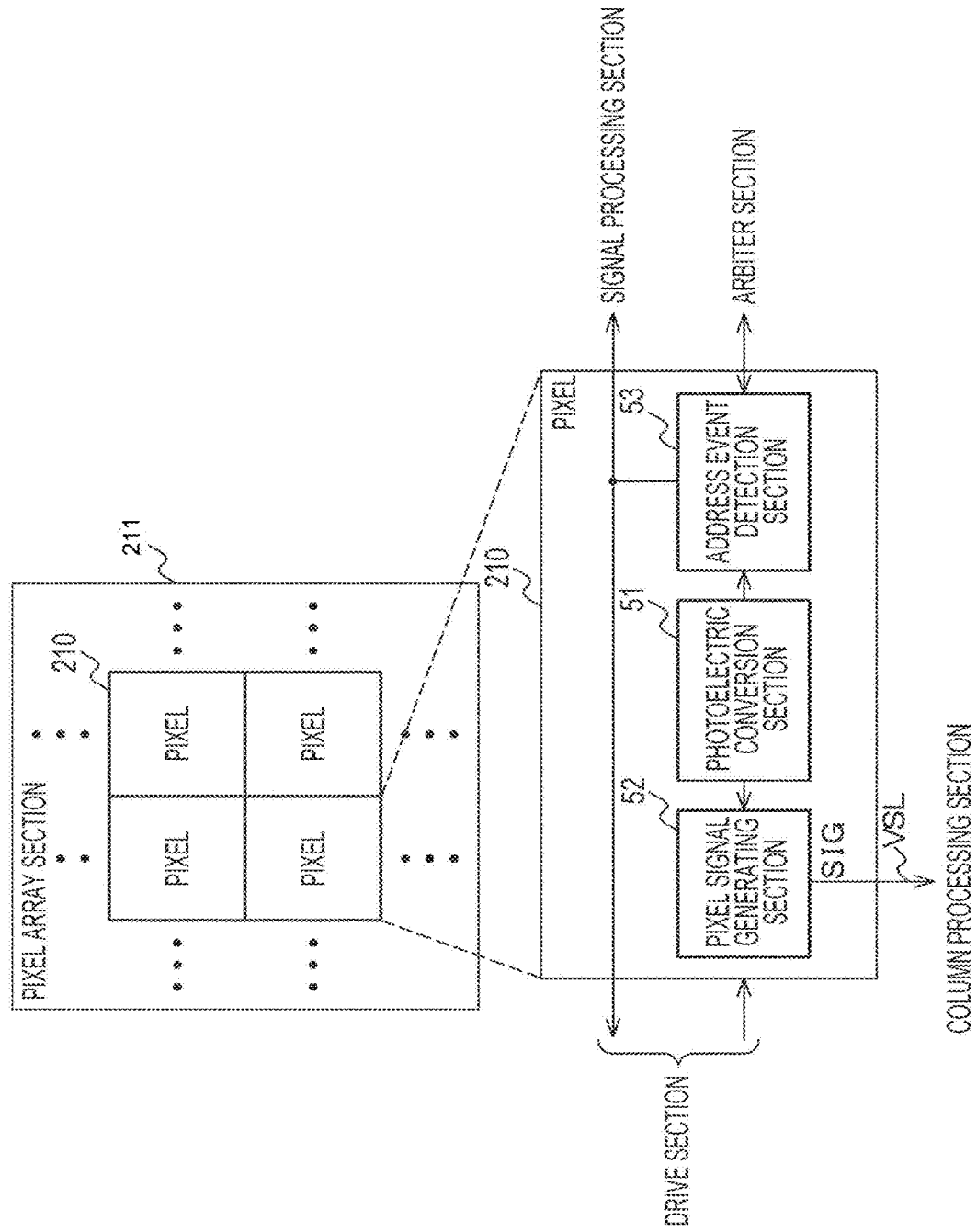
FIG. 4 is a block diagram illustrating an example of a configuration of a pixel array section in the imaging section.

FIG. 4 is a block diagram illustrating an example of a configuration of the pixel array section 211.

In the pixel array section 211 in which the plurality of pixels 210 is two-dimensionally arrayed in a matrix, the plurality of pixels 210 each include a photoelectric conversion section 51, a pixel signal generating section 52, and an address event detection section 53.

In the pixel 210 having the configuration described above, the photoelectric conversion section 51 photoelectrically converts incident light to generate a photocurrent. Then, the photoelectric conversion section 51 supplies the photocurrent generated by photoelectric conversion to either the pixel signal generating section 52 or the address event detection section 53 under the control of the drive section 212 (see FIG. 3).

The pixel signal generating section 52 generates a signal having a voltage corresponding to the photocurrent supplied from the photoelectric conversion section 51 as a pixel signal SIG, and supplies the generated pixel signal SIG to the column processing section 214 (see FIG. 3) through the vertical signal line VSL.

The address event detection section 53 detects the presence or absence of the occurrence of an address event (hereinafter, there is a case where it is simply referred to as an "event") according to whether or not the amount of change in photocurrent from each photoelectric conversion section 51 has exceeded the predetermined threshold. Examples of the address event include on events indicating that the amount of change in photocurrent has exceeded an upper limit threshold and off events indicating that the amount of change in photocurrent has fallen below a lower limit threshold. Furthermore, examples of the address event detection signal include one bit indicating the detection result of on events and one bit indicating the detection result of off events. Note that the address event detection section 53 can also be configured to detect only on events.

When an address event has occurred, the address event detection section 53 supplies a request for requesting the transmission of an address event detection signal to the arbiter section 213 (see FIG. 3). Then, when receiving a response to the request from the arbiter section 213, the address event detection section 53 supplies the address event detection signal (event data) to the drive section 212 and the signal processing section 215.

(Circuit Configuration Example of Pixel)

Figure 5:
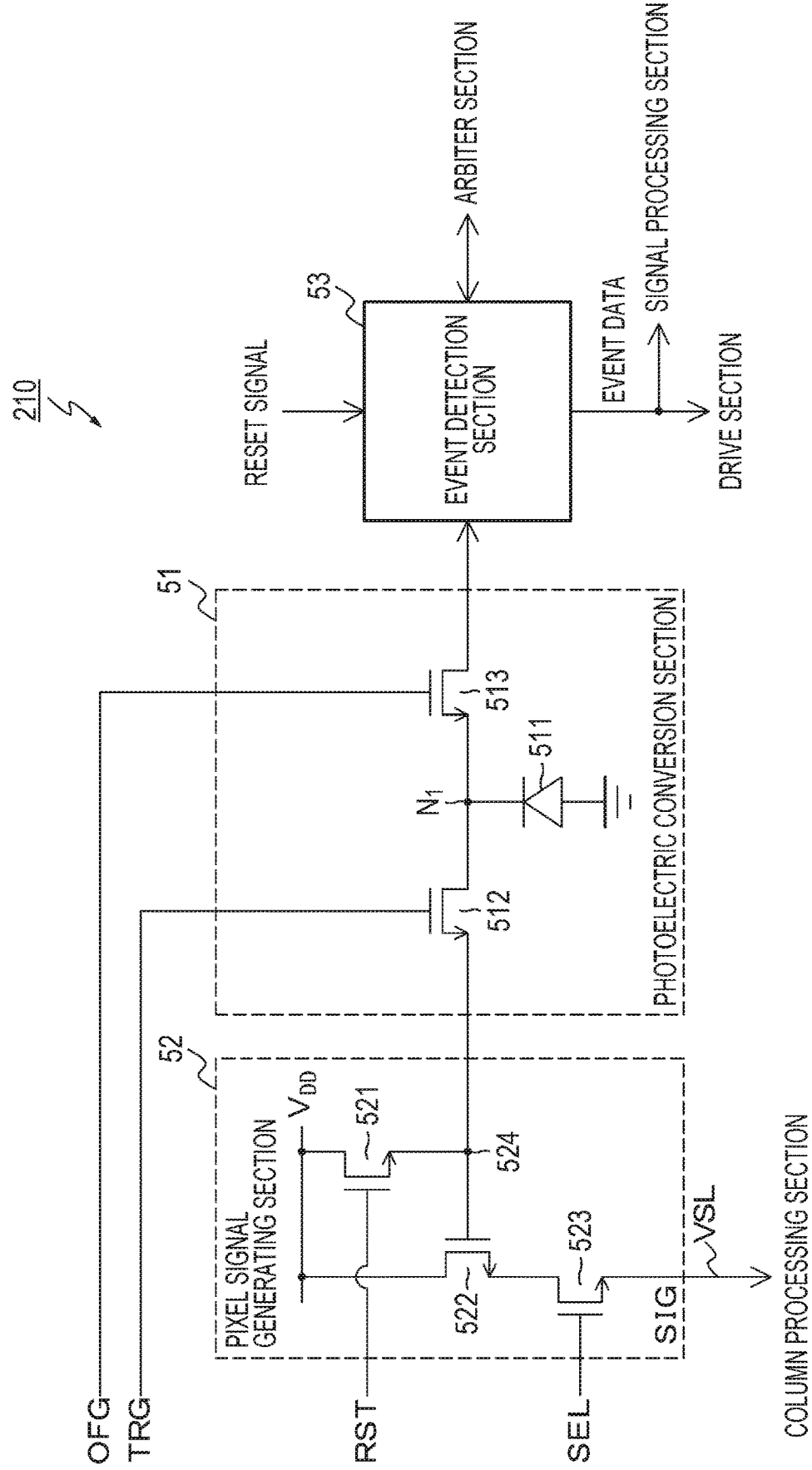
FIG. 5 is a circuit diagram illustrating an example of a circuit configuration of a pixel.

FIG. 5 is a circuit diagram illustrating an example of a circuit configuration of the pixel 210. As described above, the plurality of pixels 210 each include the photoelectric conversion section 51, the pixel signal generating section 52, and the address event detection section 53.

In the pixel 210 having the configuration described above, the photoelectric conversion section 51 includes a photoelectric conversion element (light receiving element) 511, a transfer transistor 512, and an over flow gate (OFG) transistor 513. As the transfer transistor 512 and the OFG transistor 513, for example, N-type metal oxide semiconductor (MOS) transistors can be used. The transfer transistor 512 and the OFG transistor 513 are connected in series to each other.

The photoelectric conversion element 511 is connected between a common connection node $N_1$ of the transfer transistor 512 and the OFG transistor 513 and the ground, and photoelectrically converts incident light to generate charges with a charge amount corresponding to the amount of the incident light.

A transfer signal TRG is supplied from the drive section 212 illustrated in FIG. 3 to the gate electrode of the transfer transistor 512. The transfer transistor 512 supplies, in response to the transfer signal TRG, the charges obtained through photoelectric conversion by the photoelectric conversion element 511 to the pixel signal generating section 52.

A control signal OFG is supplied from the drive section 212 to the gate electrode of the OFG transistor 513. The OFG transistor 513 supplies, in response to the control signal OFG, an electrical signal generated by the photoelectric conversion element 511 to the address event detection section 53. The electrical signal supplied to the address event detection section 53 is a photocurrent including charges.

The pixel signal generating section 52 includes a reset transistor 521, an amplification transistor 522, a selection transistor 523, and a floating diffusion layer 524. As the reset transistor 521, the amplification transistor 522, and the selection transistor 523, for example, N-type MOS transistors can be used.

The charges obtained through photoelectric conversion by the photoelectric conversion element 511 are supplied from the photoelectric conversion section 51 to the pixel signal generating section 52 by the transfer transistor 512. The charges supplied from the photoelectric conversion section 51 are accumulated in the floating diffusion layer 524. The floating diffusion layer 524 generates a voltage signal having a voltage value corresponding to the amount of accumulated charges. That is, the floating diffusion layer 524 converts the charges into a voltage.

The reset transistor 521 is connected between a power line for a power supply voltage $V_{DD}$ and the floating diffusion layer 524. A reset signal RST is supplied from the drive section 212 to the gate electrode of the reset transistor 521. The reset transistor 521 initializes (resets), in response to the reset signal RST, the amount of charges in the floating diffusion layer 524.

The amplification transistor 522 is connected in series to the selection transistor 523 between the power line for the power supply voltage $V_{DD}$ and the vertical signal line VSL. The amplification transistor 522 amplifies the voltage signal obtained through charge-to-voltage conversion by the floating diffusion layer 524.

A selection signal SEL is supplied from the drive section 212 to the gate electrode of the selection transistor 523. The selection transistor 523 outputs, in response to the selection signal SEL, the voltage signal amplified by the amplification transistor 522 to the column processing section 214 (see FIG. 3) as a pixel signal SIG through the vertical signal line VSL.

In the imaging section 21 including the pixel array section 211 in which the pixels 210 having the configuration described above are two-dimensionally arranged, when being instructed to start address event detection by the light receiving control section 30 illustrated in FIG. 1, the drive section 212 supplies the control signal OFG to the OFG transistor 513 of the photoelectric conversion section 51 to drive the OFG transistor 513, thus causing a photocurrent to be supplied to the address event detection section 53.

Then, when occurrence of an event is detected in a certain pixel 210, the drive section 212 turns off the OFG transistor 513 of the pixel 210, and stops the supply of the photocurrent to the address event detection section 53. Next, the drive section 212 supplies the transfer signal TRG to the transfer transistor 512 to drive the transfer transistor 512, thus causing charges obtained through photoelectric conversion by the photoelectric conversion element 511 to be transferred to the floating diffusion layer 524.

In this manner, the imaging section 21 including the pixel array section 211 in which the pixels 210 having the configuration described above are two-dimensionally arranged outputs only pixel signals from the pixels 210 in which occurrence of events has been detected to the column processing section 214. Therefore, as compared with a case where pixel signals from all pixels are output irrespective of the presence or absence of occurrence of events, the power consumption and processing amount of image processing of the imaging section 21, and eventually, of the imaging device 20, can be reduced.

Note that the configuration of the pixel 210 exemplified herein is an example, and is not limited to this configuration example. For example, the pixel configuration not including the pixel signal generating section 52 can also be adopted. In the case of this pixel configuration, it is only required that, in the photoelectric conversion section 51, the OFG transistor 513 be omitted and the function of the OFG transistor 513 be provided to the transfer transistor 512.

(Configuration Example of Address Event Detection Section)

Figure 6:
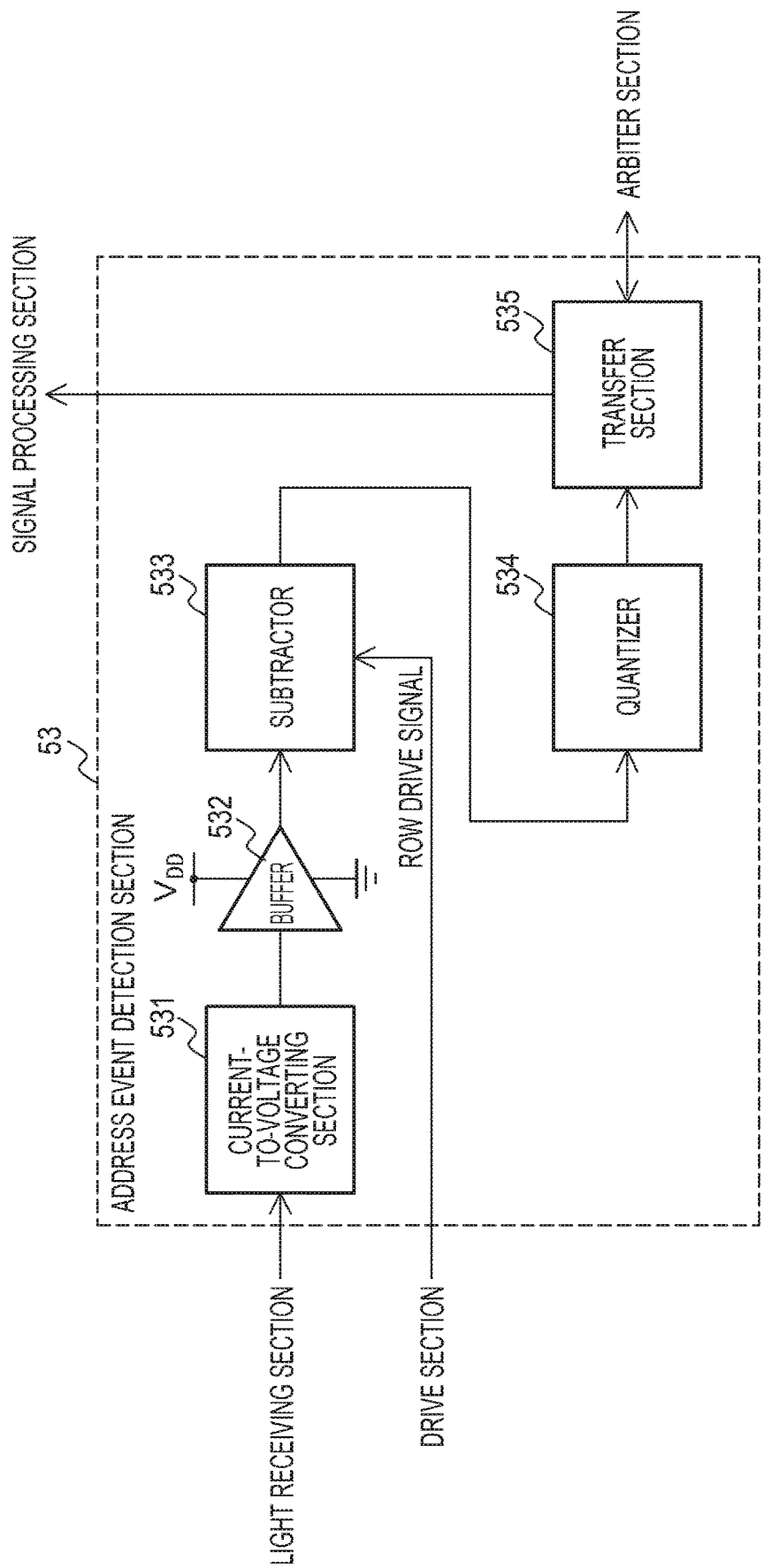
FIG. 6 is a block diagram illustrating an example of a configuration of an address event detection section.

FIG. 6 is a block diagram illustrating an example of a configuration of the address event detection section 53. As illustrated in FIG. 6, the address event detection section 53 according to this configuration example includes a current-to-voltage converting section 531, a buffer 532, a subtractor 533, a quantizer 534, and a transfer section 535.

The current-to-voltage converting section 531 converts a photocurrent from the photoelectric conversion section 51 of the pixel 210 into a voltage signal corresponding to the logarithm of the photocurrent. The current-to-voltage converting section 531 supplies the voltage signal obtained through conversion to the buffer 532. The buffer 532 buffers the voltage signal supplied from the current-to-voltage converting section 531, and supplies the voltage signal to the subtractor 533.

A row drive signal is supplied from the drive section 212 to the subtractor 533. The subtractor 533 lowers, in accordance with the row drive signal, the level of the voltage signal supplied from the buffer 532. Then, the subtractor 533 supplies the voltage signal after the level reduction to the quantizer 534. The quantizer 534 quantizes the voltage signal supplied from the subtractor 533 into a digital signal, and outputs the digital signal to the transfer section 535 as an address event detection signal (event data).

The transfer section 535 transfers the address event detection signal (event data) supplied from the quantizer 534 to the arbiter section 213 and the like. When occurrence of an event is detected, the transfer section 535 supplies a request for requesting the transmission of the address event detection signal to the arbiter section 213. Then, when receiving a response to the request from the arbiter section 213, the transfer section 535 supplies the address event detection signal to the drive section 212 and the signal processing section 215.

<Method of Controlling Imaging Device According to Embodiment of Present Disclosure>

Next, specific examples of a method of controlling the imaging device 20 according to the embodiment of the present disclosure having the configuration described above will be described.

Hereinafter, for example, examples of a method of controlling the imaging device 20 used in the light receiving section 2 of the shape measuring device 10 that measures the shape of the measurement object 5 by a light cutting method in the shape measuring system illustrated in FIG. 2 used in an inspection process in a factory or the like will be described. Note that the control of each example described below is executed under the control of the light receiving control section 30 of the light receiving section 2.

Example 1

Figure 7:
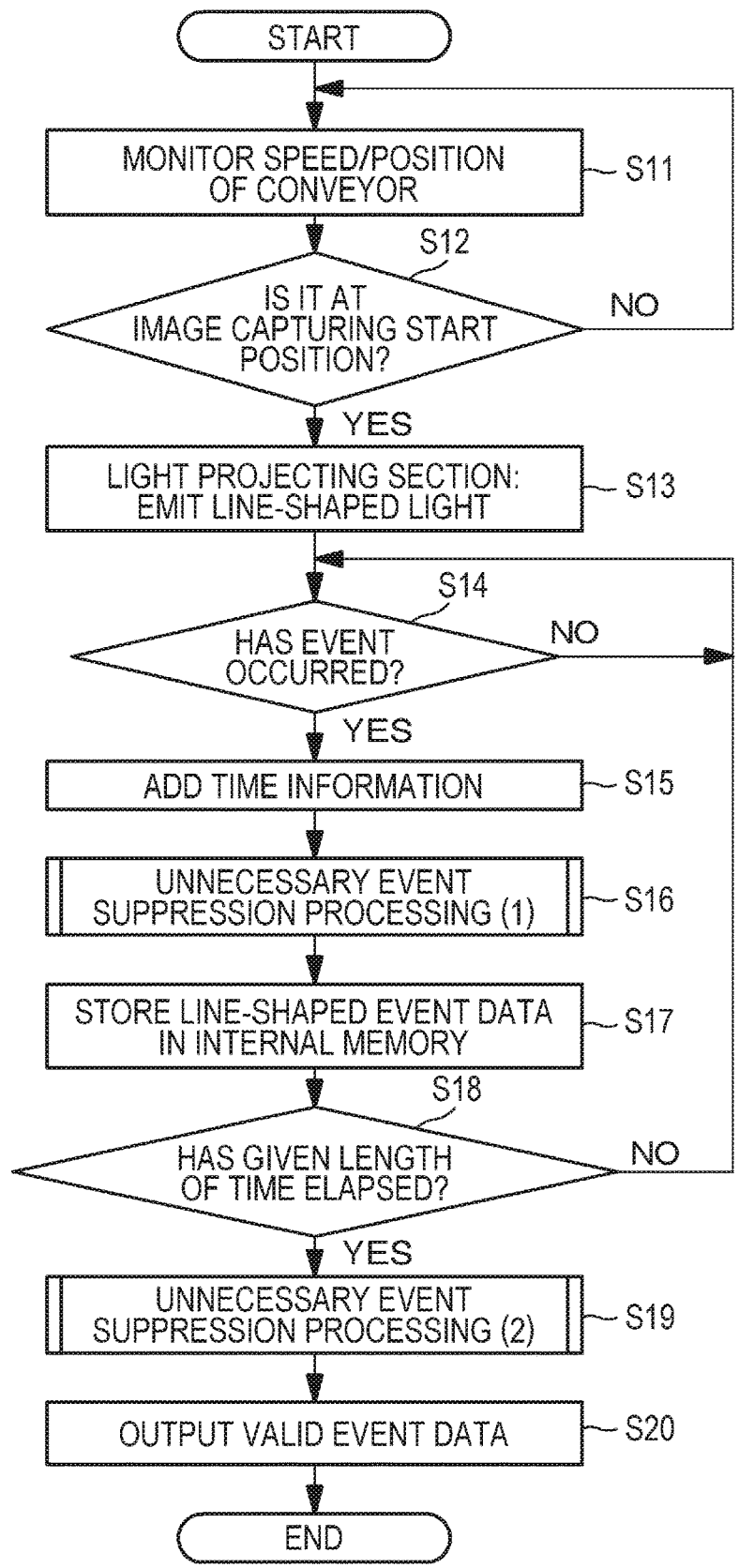
FIG. 7 is a flowchart illustrating a flow of a processing procedure of a control method according to Example 1.

Example 1 is an example of control executed in the imaging device 20 for removing unnecessary events and detecting valid events. FIG. 7 is a flowchart illustrating a flow of a processing procedure of a control method according to Example 1.

The light receiving control section 30 monitors the speed and position of the conveyor 4 that conveys the measurement objects 5 (step S11), then determines whether or not it is at the image capturing start position of the measurement object 5 (step S12), and in a case where it is determined that it is not at the image capturing start position (NO in S12), the processing returns to step S11 to continue monitoring the speed and position of the conveyor 4.

In a case where it is determined that it is at the image capturing start position (YES in S12), the light receiving control section 30 drives the light source 11 of the light projecting section 1, thus causing line-shaped light to be emitted through the cylindrical lens 12 to irradiate the measurement object 5 with the line-shaped light (S13). Next, the light receiving control section 30 determines whether or not the imaging section 21 has detected occurrence of an event, and in a case where it is determined that no event has occurred (NO in S14), repeats the detection determination of the occurrence of an event.

In a case where it is determined that an event has occurred (YES in S14), the light receiving control section 30 adds time information regarding an occurrence time of the event to the event data including the position information (coordinate data) output from the imaging section 21 (step S15), then executes unnecessary event suppression processing (1) by the unnecessary event suppression section (1) 23 (step S16). Specific processing of the unnecessary event suppression processing (1) in step S16 will be described later.

Next, the light receiving control section 30 holds the line-shaped event data in the internal memory 24 (step S17), then determines whether or not a given length of time set in advance has elapsed (step S18), and if the given length of time has not elapsed (NO in S18), the processing returns to step S14. Here, the "given length of time" is the "certain unit time" described above, and for example, is a length of time during which the measurement object 5 moving at a predetermined speed under the driving of the conveyor 4 is irradiated with the linear light 6 over the entire measurement object 5 in FIG. 2.

If the given length of time has elapsed (YES in S18), the light receiving control section 30 executes unnecessary event suppression processing (2) by the unnecessary event suppression section (2) 25 (step S19), then outputs data of valid events remaining without being removed as unnecessary events (noises) in each processing in steps S16 and S19 to the external memory 40 (step S20). Specific processing of the unnecessary event suppression processing (2) in step S19 will be described later.

According to the above, a series of processing for removing unnecessary events by the unnecessary event suppression processing (1) in step S16 and the unnecessary event suppression processing (2) in step S19, and for detecting the events that have not been removed as unnecessary events as valid events is executed. Detection data of the valid events stored in the external memory 40 is supplied to the external system control section 3 via the light receiving control section 30. Then, the system control section 3 performs control of shape measurement and the like of the measurement object 5 on the basis of the detection data of the valid events.

Example 2

Example 2 is a processing example of a sub-process for removing unnecessary events executed in the unnecessary event suppression section (1) 23. FIG. 8 illustrates a conceptual diagram of processing in the unnecessary event suppression section (1) 23 according to Example 2.

In FIG. 8, a vertical axis x represents the width (depth) of an image when the imaging section 21 images the measurement object 5, and a horizontal axis y represents the height of the image. In addition, FIG. 8 illustrates coordinates of events that occur within a certain unit time, and upper limit setting values/lower limit setting values of expected positions of reflected light events set in advance. As an example, FIG. 8 illustrates reflected light events detected as valid events (shaded events in the figure), reflected light events due to occurrence of unnecessary events (events in portions $O_1$, $O_2$, and $O_3$ in the figure), reflected light events having a shape different from the original shape (events in a portion P in the figure), and upper limit setting values/lower limit setting values of expected positions of reflected light events (hatched events in the figure). Furthermore, ideal cutting shapes (main lines) are illustrated by bold squares.

Figure 9A:
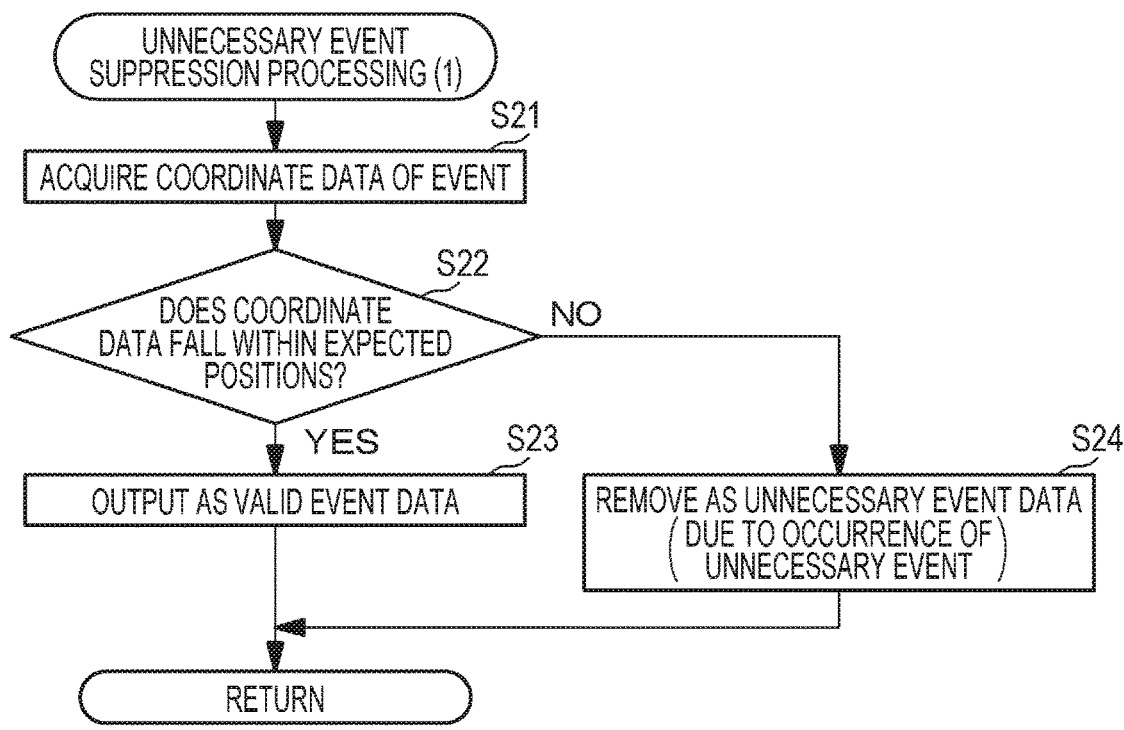
FIG. 9A is a flowchart illustrating a processing example of a sub-process of the unnecessary event suppression section (1) according to Example 2.

FIG. 9A is a flowchart illustrating a processing example of a sub-process of the unnecessary event suppression section (1) 23 according to Example 2.

In processing in the unnecessary event suppression section (1) 23, the light receiving control section 30 first acquires coordinate data (position information) of the events detected (step S21), then determines whether or not the coordinate data of the events detected falls within the range of the upper limit setting values/lower limit setting values of the expected positions of the reflected light events (step S22).

If the coordinate data of the events detected falls within the range of the upper limit setting values/lower limit setting values of the expected positions of the reflected light events (YES in S22), the light receiving control section 30 regards the events detected as valid events, and outputs the data thereof (step S23). If the coordinate data of the events detected does not fall within the range of the upper limit setting values/lower limit setting values of the expected positions of the reflected light events (NO in S22), the light receiving control section 30 removes the data thereof as events due to occurrence of unnecessary events (step S24), and the processing returns to step S17 in FIG. 7.

In the example of FIG. 8, the reflected light events in the portions $O_1$, $O_2$, and $O_3$ are removed as events due to occurrence of unnecessary events by the processing in the unnecessary event suppression section (1) 23 according to Example 2 described above.

Example 3

Figure 9B:
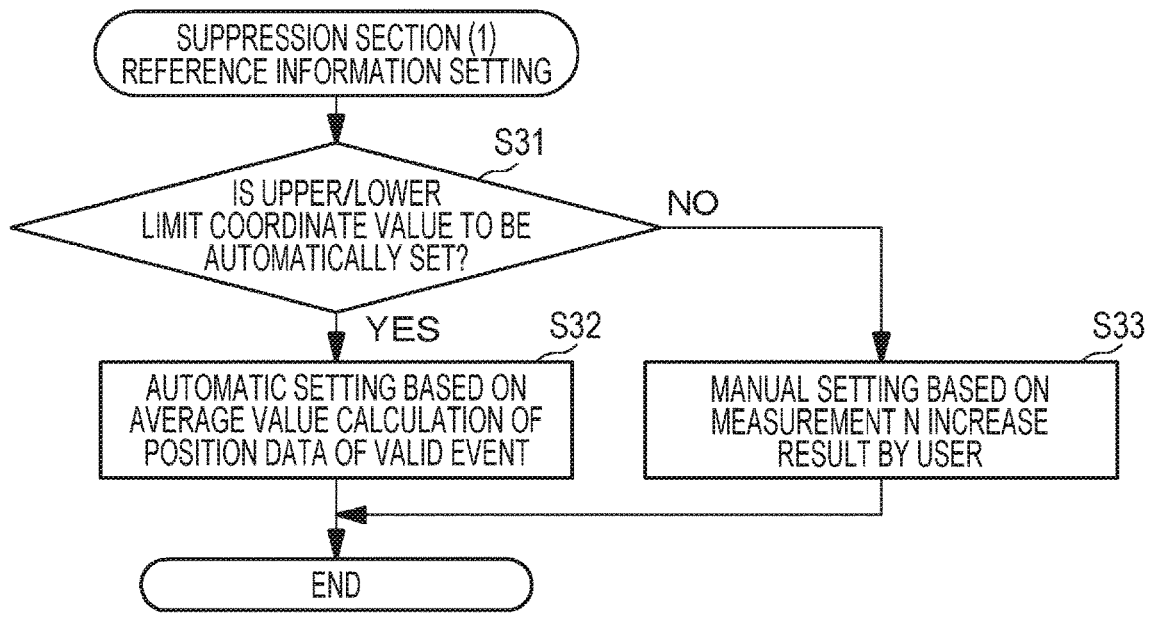
FIG. 9B is a flowchart illustrating a processing example of a sub-process of a suppression section (1) reference information setting section according to Example 3.

Example 3 is a processing example of a sub-process for setting the upper limit setting values and the lower limit setting values of the expected positions of the events executed in the suppression section (1) reference information setting section 26. FIG. 9B illustrates a flowchart of a processing example of a sub-process of the suppression section (1) reference information setting section 26 according to Example 3.

The light receiving control section 30 first determines whether the upper limit setting values and the lower limit setting values of the expected positions of the events are to be automatically set or to be manually set by a user (step S31). Whether the upper limit setting values and the lower limit setting values of the expected positions of the events are to be automatically set or to be manually set by a user is set in advance by a user, for example.

In a case of automatic setting (YES in S31), the light receiving control section 30 automatically sets the upper limit setting values and the lower limit setting values of the expected positions of the events on the basis of an average value calculation result of position data of valid events (step S32).

In a case of manual setting (NO in S31), the light receiving control section 30 manually sets the upper limit setting values and the lower limit setting values of the expected positions of the events on the basis of a so-called N increase result of increasing the number of times N of measurement execution by a user (step S33).

Through the above series of processing, the upper limit setting values and the lower limit setting values of the expected positions of the events used in processing in the unnecessary event suppression section (1) 23 can be set by automatic setting or manual setting by a user.

Example 4

Figure 10A:
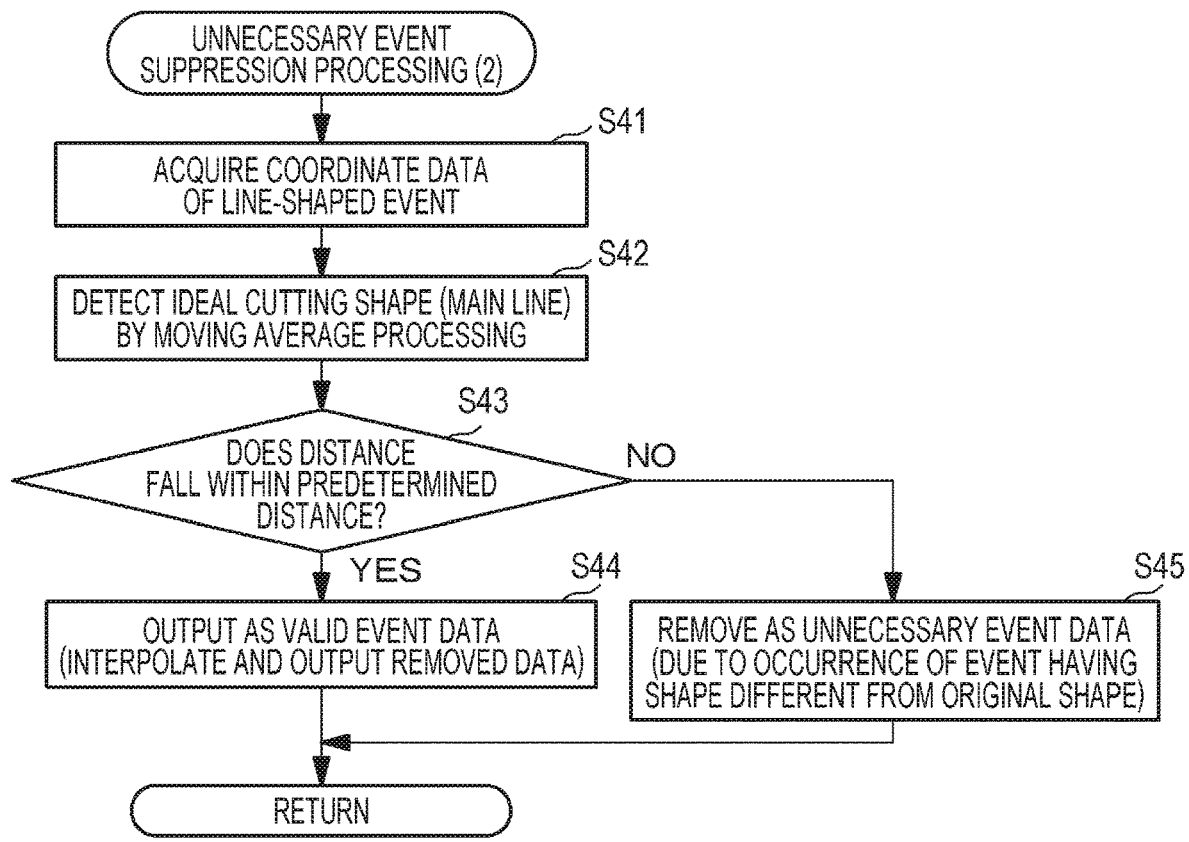
FIG. 10A is a flowchart illustrating a processing example of a sub-process of an unnecessary event suppression section (2) according to Example 4.

Example 4 is a processing example of a sub-process for removing unnecessary events executed in the unnecessary event suppression section (2) 25. FIG. 10A illustrates a flowchart of a processing example of a sub-process of the unnecessary event suppression section (2) 25 according to Example 4.

Figure 11:
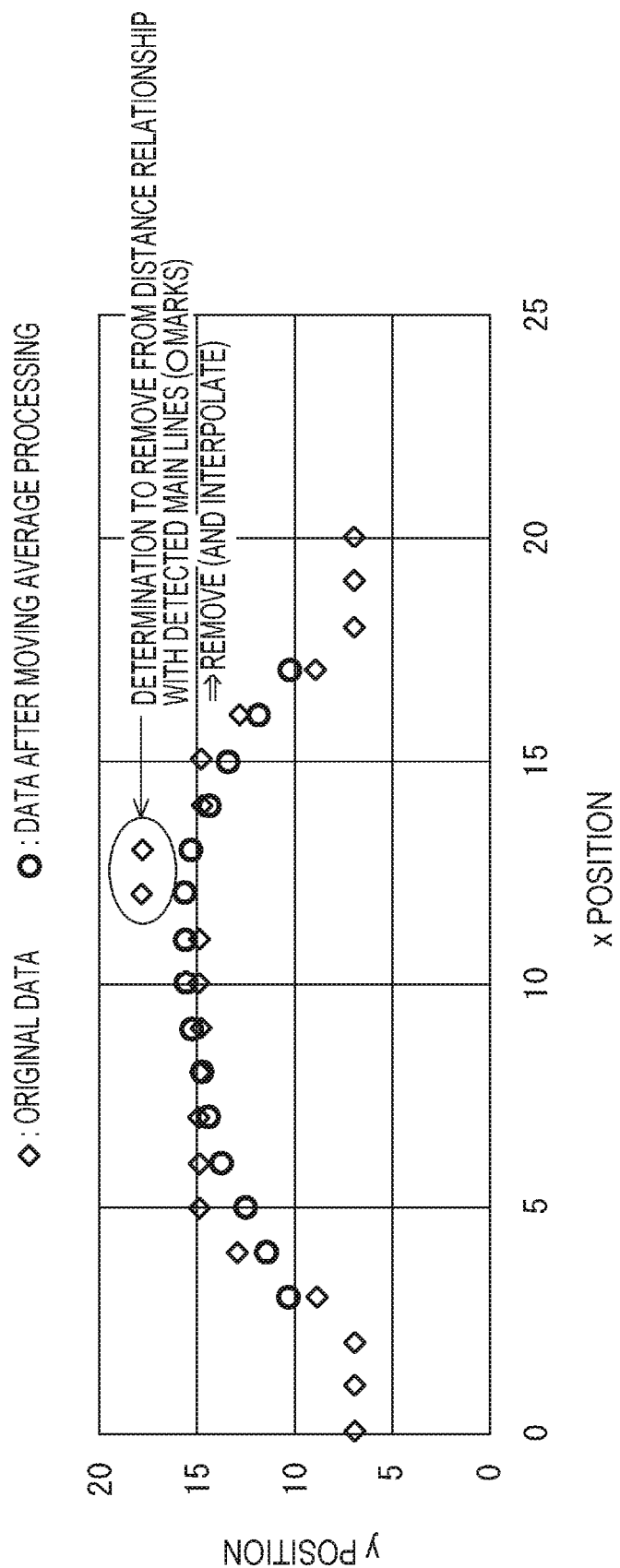
FIG. 11 is an explanatory diagram illustrating a relationship between original data and data after moving average processing.

In processing in the unnecessary event suppression section (2) 25 according to Example 4, the light receiving control section 30 acquires coordinate data (position information) of line-shaped events from among the events stored in the internal memory 24 (step S41), then detects the ideal cutting shape (main line) by the moving average processing based on the number of moving average data (step S42). The number of moving average data is the number of data when the moving average processing is performed. FIG. 11 illustrates a relationship between the original data and the data after moving average processing. In FIG. 11, square marks represent the original data, and circle (0) marks represent the data after moving average processing. The graph in FIG. 11 is a moving average of four pieces of data.

Next, the light receiving control section 30 determines whether or not the distance between the coordinate data of the line-shaped events and the detected ideal cutting shape (main line) falls within a predetermined inter-main line distance value set in the suppression section (2) reference information setting section 27 (step S43), and in a case where the distance falls within the predetermined inter-main line distance value (YES in S43), the light receiving control section 30 regards the data thereof as valid event data (step S44), and returns to step S20 in FIG. 7 to output the valid event data. At this time, the data of the removed unnecessary events may be interpolated and output by using the data obtained through the moving average processing.

In a case where the distance between the coordinate data of the line-shaped events and the detected ideal cutting shape (main line) does not fall within the predetermined inter-main line distance value (NO in S43), the light receiving control section 30 removes the data thereof as data of unnecessary events due to occurrence of events having a shape different from the original shape (step S45), and the processing returns to step S20 in FIG. 7.

In the conceptual diagram in FIG. 8, the reflected light events having a shape different from the original shape (events in the portion P in the figure) fall within the range of the upper limit setting values/lower limit setting values of the expected positions of the events, and thus cannot be removed in processing in the unnecessary event suppression section (1) 23 according to Example 2. On the other hand, according to the processing in the unnecessary event suppression section (2) 25 of Example 4, the reflected light events having a shape different from the original shape (events in the portion P) can be removed according to the distance relationship with the main lines detected (square marks in FIG. 8).

Example 5

Figure 10B:
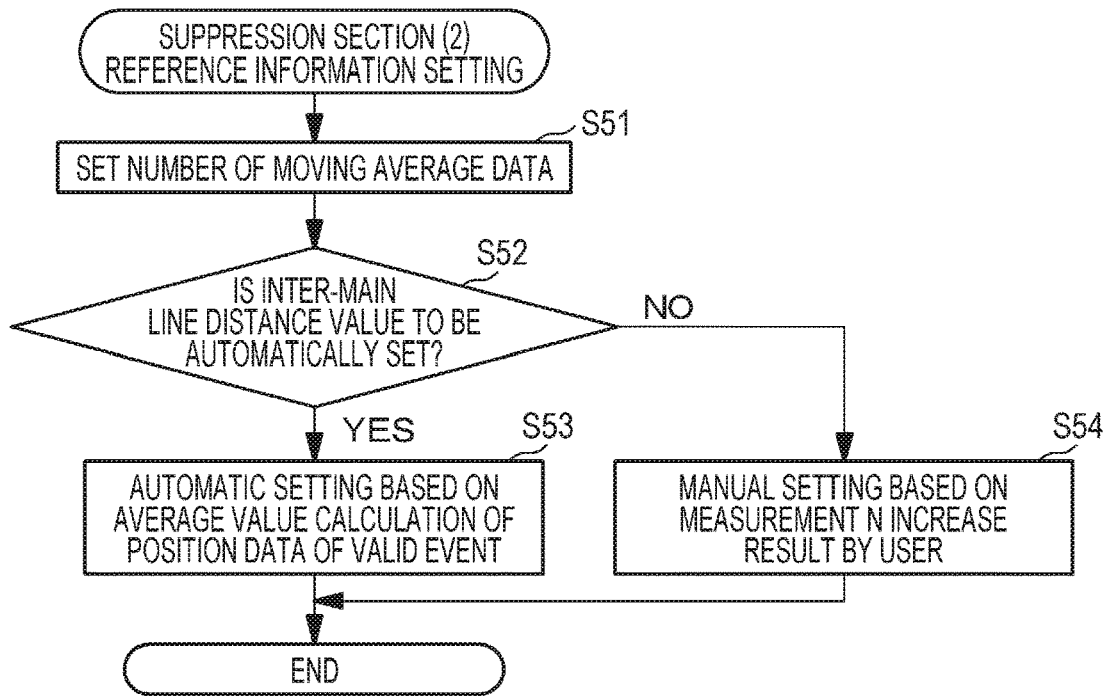
FIG. 10B is a flowchart illustrating a processing example of a sub-process of a suppression section (2) reference information setting section according to Example 5.

Example 5 is a processing example of a sub-process for setting the number of moving average data and setting the inter-main line distance value executed in the suppression section (2) reference information setting section 27. FIG. 10B illustrates a flowchart of a processing example of a sub-process of the suppression section (2) reference information setting section 27 according to Example 5.

The light receiving control section 30 first sets the number of moving average data used in the moving average processing (step S51), then determines whether the inter-main line distance value is to be automatically set or to be manually set by a user (step S52). Whether the inter-main line distance value is to be automatically set or to be manually set by a user is set in advance by a user, for example.

In a case of automatic setting (YES in S52), the light receiving control section 30 automatically sets the inter-main line distance value on the basis of the average value calculation result of the position data of the valid events (step S53), and in a case of manual setting (NO in S52), the light receiving control section 30 manually sets the inter-main line distance value on the basis of the N increase result by a user (step S53).

Through the above series of processing, the number of moving average data and the inter-main line distance value used in processing in the unnecessary event suppression section (2) 25 can be set by automatic setting or manual setting by a user.

Example 6

Figure 12:
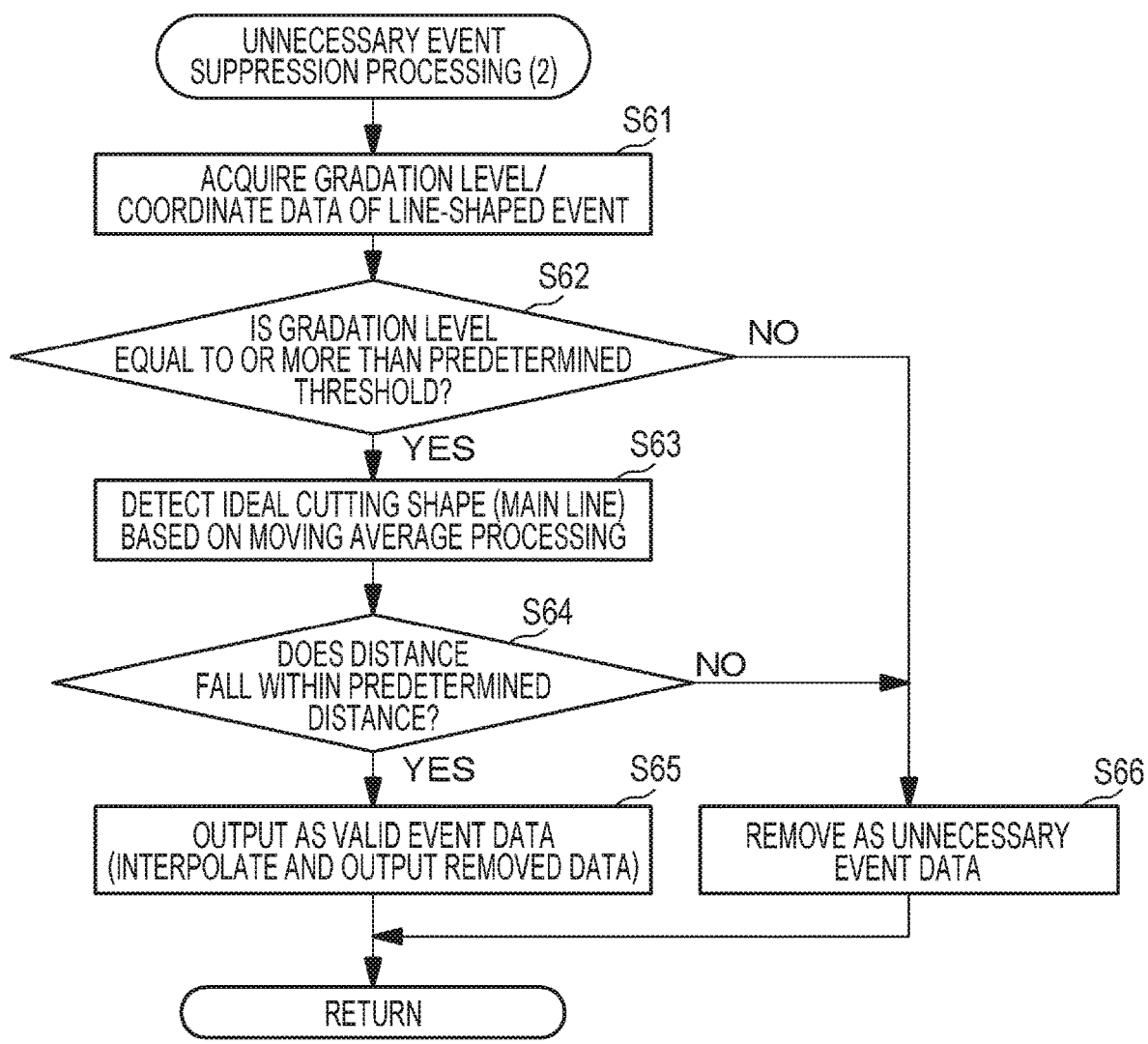
FIG. 12 is a flowchart illustrating a processing example of a sub-process of the unnecessary event suppression section (2) according to Example 6.

Example 6 is an example in which event data includes, in addition to the position information (coordinate data) and the time information, gradation information (gradation level), and is a processing example of a sub-process for removing unnecessary events executed in the unnecessary event suppression section (2) 25. FIG. 12 illustrates a flowchart of a processing example of a sub-process of the unnecessary event suppression section (2) 25 according to Example 6.

Note that the "gradation information" is supplied to the signal processing section 215 via the column processing section 214 in FIG. 3, for example, and can be added to the event data by using the signal level of a pixel signal after processing in the signal processing section 215.

In processing in the unnecessary event suppression section (2) 25 according to Example 6, the light receiving control section 30 acquires the coordinate data (position information) and the gradation level of the line-shaped events from among the events stored in the internal memory 24 (step S61), then determines whether or not the gradation level is equal to or more than a predetermined gradation threshold (step S62).

If the gradation level is equal to or more than the predetermined gradation threshold (YES in S62), the light receiving control section 30 detects the ideal cutting shape (main line) based on the moving average processing (step S63), then determines whether or not the distance between the coordinate data of the line-shaped events and the detected ideal cutting shape (main line) falls within the predetermined inter-main line distance value set in the suppression section (2) reference information setting section 27 (step S64).

In a case where the distance between the coordinate data of the line-shaped events and the detected ideal cutting shape (main line) falls within the predetermined inter-main line distance value (YES in S64), the light receiving control section 30 regards the data thereof as the valid event data (step S65), and returns to step S20 in FIG. 7 to output the valid event data. At this time, the data of the removed unnecessary events may be interpolated and output by using the data obtained through the moving average processing.

In a case where it is determined that the gradation level is not equal to or more than the predetermined gradation threshold, that is, less than the predetermined gradation threshold in processing in step S62 (NO in S62), the light receiving control section 30 removes the data thereof as unnecessary event data (step S66), and the processing returns to step S20 in FIG. 7. In processing in step S66 at this time, data of detection events having a small gradation level are removed as data of unnecessary events.

In a case where it is determined that the distance between the coordinate data of the line-shaped events and the detected ideal cutting shape (main line) does not fall within the inter-main line distance value in processing in step S64 (NO in S64), the light receiving control section 30 removes the data thereof as unnecessary event data (step S66), and the processing returns to step S20 in FIG. 7. In processing in step S66 at this time, the data is removed as data of unnecessary events due to occurrence of events having a shape different from the original shape.

As described above, according to the processing in the unnecessary event suppression section (2) 25 of Example 6, it is possible to more accurately detect valid event data by performing processing of removing detection events having a small gradation level as unnecessary events in consideration of the gradation level of events detected.

Example 7

Figure 13:
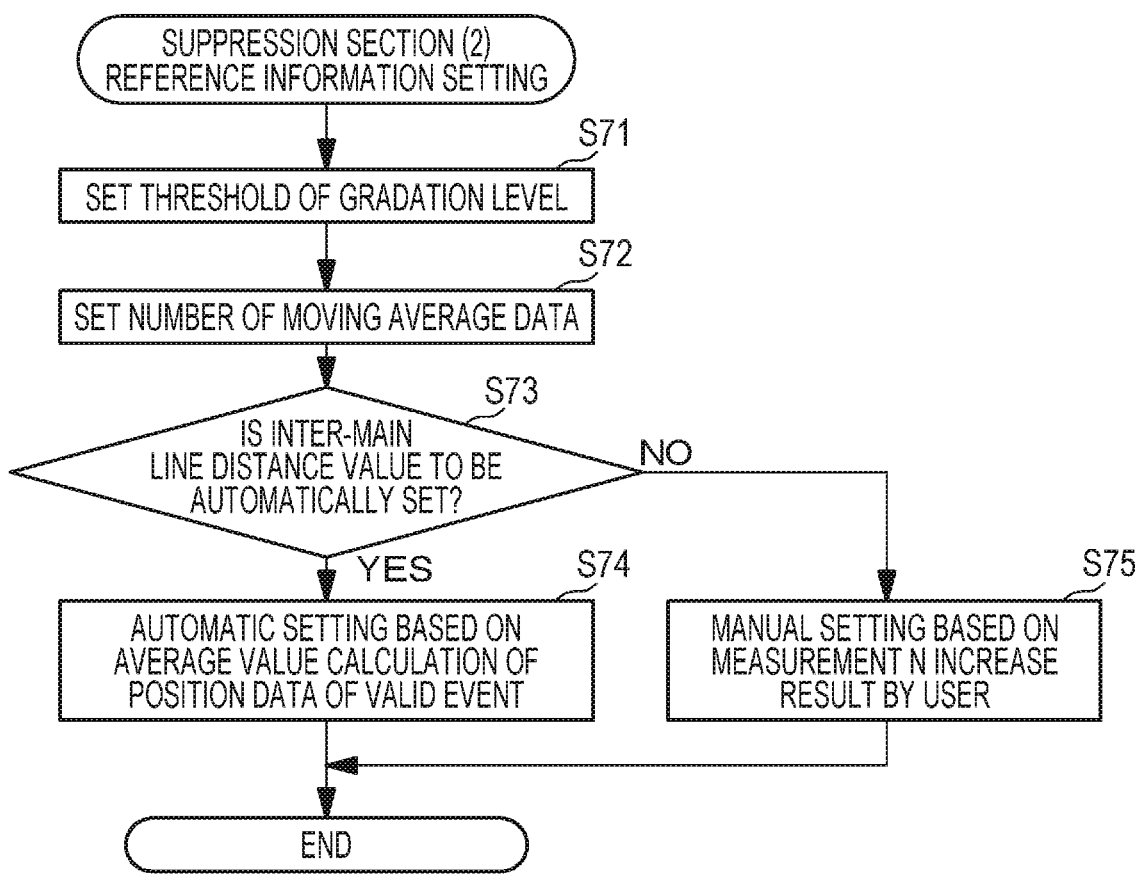
FIG. 13 is a flowchart illustrating a processing example of a sub-process of the suppression section (2) reference information setting section according to Example 7.

Example 7 is an example in which event data includes, in addition to the position information (coordinate data) and the time information, gradation information (gradation level), and is a processing example of a sub-process for setting the number of moving average data, setting the inter-main line distance value, and setting the gradation level executed in the suppression section (2) reference information setting section 27. FIG. 13 illustrates a flowchart of a processing example of a sub-process of the suppression section (2) reference information setting section 27 according to Example 5.

The light receiving control section 30 first sets a threshold of the gradation level (step S71), then sets the number of moving average data (step S72), and then determines whether the inter-main line distance value is to be automatically set or to be manually set by a user (step S73). Whether the inter-main line distance value is to be automatically set or to be manually set by a user is set in advance by a user, for example.

In a case of automatic setting (YES in S73), the light receiving control section 30 automatically sets the inter-main line distance value on the basis of the average value calculation of the position data of the valid events (step S74), and in a case of manual setting (NO in S73), the light receiving control section 30 manually sets the inter-main line distance value on the basis of the N increase result by a user (step S75).

Through the above series of processing, the number of moving average data, the inter-main line distance value, and the gradation information (gradation level) used in processing in the unnecessary event suppression section (2) 25 can be set by automatic setting or manual setting by a user.

Note that the threshold of the gradation level may be uniformly set with respect to the entire light receiving area of the imaging section 21, or the light receiving area of the imaging section 21 may be divided into areas of a predetermined size, and the threshold of the gradation level may be set for each area obtained through division.

<Modification>

The technology of the present disclosure has been described above on the basis of a preferred embodiment. However, the technology of the present disclosure is not limited to the embodiment. The configuration and structure of the imaging device and the shape measuring device described in the above embodiment are examples, and may be changed as appropriate. For example, in the embodiment described above, the unnecessary event suppression section (2) 25 is included in addition to the unnecessary event suppression section (1) 23, but only the unnecessary event suppression section (1) 23 may be included, and it is possible to remove unnecessary events (noises) and reduce the amount of output data compared with a case where the unnecessary event suppression section (1) 23 is not included.

<Configuration that can be Taken by Present Disclosure>

Note that the present disclosure can also have the following configurations.

<<A. Imaging Device>>

[A-01] An imaging device including:
  an imaging section in which pixels that photoelectrically convert entering light reflected from a measurement object are arranged, the imaging section detecting that amounts of change in luminance of the pixels have exceeded a predetermined threshold as events; and
  an event suppression section that removes an event having position information outside a range of an upper limit setting value and a lower limit setting value of an expected position from among the events detected by the imaging section as an unnecessary event.

[A-02] The imaging device according to [A-01] described above, further including
  a first reference information setting section that sets in advance the upper limit setting value and the lower limit setting value of the expected position as reference information of the event suppression section. [A-03] The imaging device according to [A-02] described above,
  in which the first reference information setting section is capable of setting the upper limit setting value and the lower limit setting value of the expected position by manual setting based on an N increase result of increasing a number of times N of measurement execution by a user, or automatic setting based on an average value calculation result of position information of valid events remaining after removal processing by the event suppression section.

[A-04] The imaging device according to any one of [A-01] to [A-03] described above,
  in which the event suppression section detects, with an ideal cutting shape as a main line, a position of the main line on an assumption that an image obtained by imaging the measurement object has a line shape, and removes an event having a shape different from an original shape of the measurement object as an unnecessary event according to a relationship between position information of the main line detected and position information of events that have occurred.

[A-05] The imaging device according to [A-04] described above,
  in which the event suppression section detects the position of the main line by moving average processing.

[A-06] The imaging device according to [A-05] described above,
  in which the event suppression section interpolates and outputs data of the event removed by using data obtained through the moving average processing.

[A-07] The imaging device according to any one of [A-04] to [A-06] described above,
  in which the event suppression section removes an event in which a distance between the position of the main line detected and the position of the event that has occurred does not fall within a predetermined inter-main line distance value as an unnecessary event.

[A-08] The imaging device according to [A-07] described above, further including
  a second reference information setting section that sets in advance the predetermined inter-main line distance value as reference information of the event suppression section. [A-09] The imaging device according to [A-08] described above, in which the second reference information setting section is capable of setting the predetermined inter-main line distance value by manual setting based on an N increase result of increasing a number of times N of measurement execution by a user, or automatic setting based on an average value calculation result of position information of valid events remaining after removal processing by the event suppression section.

[A-10] The imaging device according to any one of [A-01] to [A-09] described above,
in which data of the events detected by the imaging section includes, in addition to the position information, gradation information.

[A-11] The imaging device according to [A-10] described above,
in which the event suppression section removes an event having the gradation information less than a predetermined gradation threshold as an unnecessary event.

[A-12] The imaging device according to any one of [A-01] to [A-01] described above,
in which the imaging section includes a non-scanning imaging device.

<<B. Method of Controlling Imaging Device>>

[B-01] A method of controlling an imaging device, the method including
in controlling the imaging device that includes
an imaging section in which pixels that photoelectrically convert entering light reflected from a measurement object are arranged, the imaging section detecting that amounts of change in luminance of the pixels have exceeded a predetermined threshold as events,
removing an event having position information outside a range of an upper limit setting value and a lower limit setting value of an expected position from among the events detected by the imaging section as an unnecessary event.

[B-02] The method of controlling an imaging device according to [B-01] described above, further including
after removing the event having the position information outside the range of the upper limit setting value and the lower limit setting value of the expected position as an unnecessary event, detecting, with an ideal cutting shape as a main line, a position of the main line on an assumption that an image obtained by imaging the measurement object has a line shape, and removing an event having a shape different from an original shape of the measurement object as an unnecessary event according to a relationship between position information of the main line detected and position information of events that have occurred.

[B-03] The method of controlling an imaging device according to [B-01] or [B-02] described above,
in which the imaging section includes a non-scanning imaging device.

<<C. Shape Measuring Device>>

[C-01] A shape measuring device including:
a light projecting section that irradiates a measurement object with light; and
a light receiving section that receives reflected light, from the measurement object, based on irradiation light from the light projecting section,
in which the light receiving section includes:
an imaging section in which pixels that photoelectrically convert entering light reflected from the measurement object are arranged, the imaging section detecting that amounts of change in luminance of the pixels have exceeded a predetermined threshold as events; and
an event suppression section that removes an event having position information outside a range of an upper limit setting value and a lower limit setting value of an expected position from among the events detected by the imaging section as an unnecessary event.

[C-02] The shape measuring device according to [C-01] described above,
in which the measurement object is mounted on a conveyor and is moved.

[C-03] The shape measuring device according to [C-02] described above,
in which the light projecting section irradiates the measurement object with linear light in a direction perpendicular to a moving direction of the measurement object.

[C-04] The shape measuring device according to any one of [C-01] to [C-03] described above,
in which the event suppression section detects, with an ideal cutting shape as a main line, a position of the main line on an assumption that an image obtained by imaging the measurement object has a line shape, and removes an event having a shape different from an original shape of the measurement object as an unnecessary event according to a relationship between position information of the main line detected and position information of events that have occurred.

[C-05] The shape measuring device according to any one of [C-01] to [C-04] described above,
in which the imaging section includes a non-scanning imaging device.

REFERENCE SIGNS LIST

1 Light projecting section
2 Light receiving section
3 System control section
4 Conveyor
5 Measurement object
6 Linear light
10 Shape measuring device
11 Light source
12 Cylindrical lens
20 Imaging device
21 Imaging section
22 Time adding section
23 Unnecessary event suppression section (1)
24 Internal memory
25 Unnecessary event suppression section (2)
26 Suppression section (1) reference information setting section
27 Suppression section (2) reference information setting section
30 Light receiving control section
40 External memory
50 Infrared cut filter
60 Lens

The invention claimed is:

1. An imaging device, comprising:
an imaging sensor configured to:
receive light from a measurement object, wherein the imaging sensor includes a plurality of pixels, and the plurality of pixels is configured to photoelectrically convert the received light;
detect, based on the photoelectrically converted light, an amount of change in luminance of the plurality of pixels is greater than as a plurality of events, wherein each event of the plurality of events includes a position;

capture an image of the measurement object; and
detect an ideal cutting shape of the measurement object based on the captured image,
wherein the ideal cutting shape is a main line; and
an event suppression circuit configured to:
detect a position of the main line based on the detected main line; remove a first event from the plurality of events based on a relationship between the detected position of the main line and the position of the plurality of events,
wherein a shape of the first event is different from the ideal cutting shape, and
the first event corresponds to a first unnecessary event; and
remove a second event from the plurality of events,
wherein the second event has the position outside a range of a first limit setting value of the expected position and a second limit setting value of the expected position,
the second limit setting value is lower than the first limit setting value, and
the second event corresponds to a second as an unnecessary event.

2. The imaging device according to claim 1, further comprising a first reference information setting circuit configured to set the first limit setting value of the expected position and the second limit setting value of the expected position as reference information.

3. The imaging device according to claim 2, wherein the first reference information setting circuit is further configured to set, the first limit setting value of the expected position and the second limit setting value of the expected position, based on a user input and an increase in a result of increase in a number of times of measurement execution for the measurement object.

4. The imaging device according to claim 1, wherein the event suppression circuit is further configured to detect the position of the main line based on a moving average process.

5. The imaging device according to claim 4, wherein the event suppression circuit is further configured to:
obtain data based on the moving average process;
interpolate, based on the obtained data, data of the first event; and
output the interpolated data of the first event.

6. The imaging device according to claim 1, wherein the event suppression circuit is further configured to:
determine a distance between the detected position of the main line and the position of the plurality of events is within a specific inter-main line distance value; and
remove the first event based on the determination that the distance between the detected position of the main line and the position of the plurality of events is within the specific inter-main line distance value.

7. The imaging device according to claim 6, further comprising a reference information setting circuit configured to set the specific inter-main line distance value as reference information.

8. The imaging device according to claim 7, wherein the reference information setting circuit is further configured to set the specific inter-main line distance value based on a user input and an increase in a result of increase in a number of times of measurement execution for the measurement object.

9. The imaging device according to claim 1, wherein each event of the plurality of events further includes a gradation level.

10. The imaging device according to claim 9, wherein the event suppression circuit is further configured to:
determine that the gradation level of a third event of the plurality of events is less than a gradation threshold; and
remove the third event based on the determination that the gradation level of the third event is less than the gradation threshold, and the third event corresponds to a third unnecessary event.

11. The imaging device according to claim 1, wherein the imaging sensor is part of a non-scanning imaging device.

12. A method of controlling an imaging device, the method comprising:
in the imaging device that includes an imaging sensor that includes a plurality of pixels and an event suppression circuit:
receiving, by the imaging sensor, light from a measurement object;
photoelectrically converting, by the plurality of pixels, the received light;
detecting, by the imaging sensor, based on the photoelectrically converted light, an amount of change in luminance of the plurality of pixels is greater than a threshold as a plurality of events, wherein each event of the plurality of events includes a position;
capturing, by the imaging sensor, an image of the measurement object;
detecting, by the imaging sensor, an ideal cutting shape of the measurement object based on the captured image, wherein the ideal cutting shape is a main line;
detecting, by the event suppression circuit, a position of the main line based on the detected main line;
removing, by the event suppression circuit, a first event from the plurality of events based on a relationship between the detected position of the main line and the position of the plurality of events, wherein
a shape of the first event is different from the ideal cutting shape, and
the first event corresponds to a first unnecessary event; and
removing, by the event suppression circuit, a second event from the plurality of events, wherein
the second event has the position outside a range of a first limit setting value of an expected position and a second limit setting value of the expected position,
the second limit setting value is lower than the first limit setting value, and
the second event corresponds to a second unnecessary event.

13. The method of controlling the imaging device according to claim 12, wherein the imaging sensor is part of a non-scanning imaging device.

14. A shape measuring device, comprising:
a light projector configured to irradiate a measurement object with light; and
a light receiving section comprising an imaging sensor and an event suppression circuit, wherein
the imaging sensor includes a plurality of pixels,
the light receiving section is configured to receive the light from the measurement object,
the plurality of pixels is configured to photoelectrically convert the received light,
the imaging sensor is configured to:
detect, based on the photoelectrically converted light, an amount of change in luminance of the plurality of pixels is greater than a threshold as a plurality of events, wherein each event of the plurality of events includes a position;

capture an image of the measurement object; and
detect an ideal cutting shape of the measurement object based on the captured image, wherein the ideal cutting shape is a main line, and the event suppression circuit is configured to:
- detect a position of the main line based on the detected main line;
- remove a first event from the plurality of events based on a relationship between the detected position of the main line and the position of the plurality of events, wherein
  - a shape of the first event is different from the ideal cutting shape, and
  - the first event corresponds to a first unnecessary event, and remove a second event from the plurality of events, wherein
- the second event has the position outside a range of a first limit setting value of an expected position and a second limit setting value of the expected position,
  - the second limit setting value is lower than the first limit setting value, and
  - the second event corresponds to a second as an unnecessary event.

15. The shape measuring device according to claim 14, wherein the measurement object is mountable on a conveyor.

16. The shape measuring device according to claim 15, wherein the light projector is further configured to irradiate the measurement object with the light in a direction perpendicular to a moving direction of movement of the measurement object.

17. The shape measuring device according to claim 14, wherein the imaging sensor is part of a non-scanning imaging device.

* * * * *